UNITED STATES PATENT OFFICE.

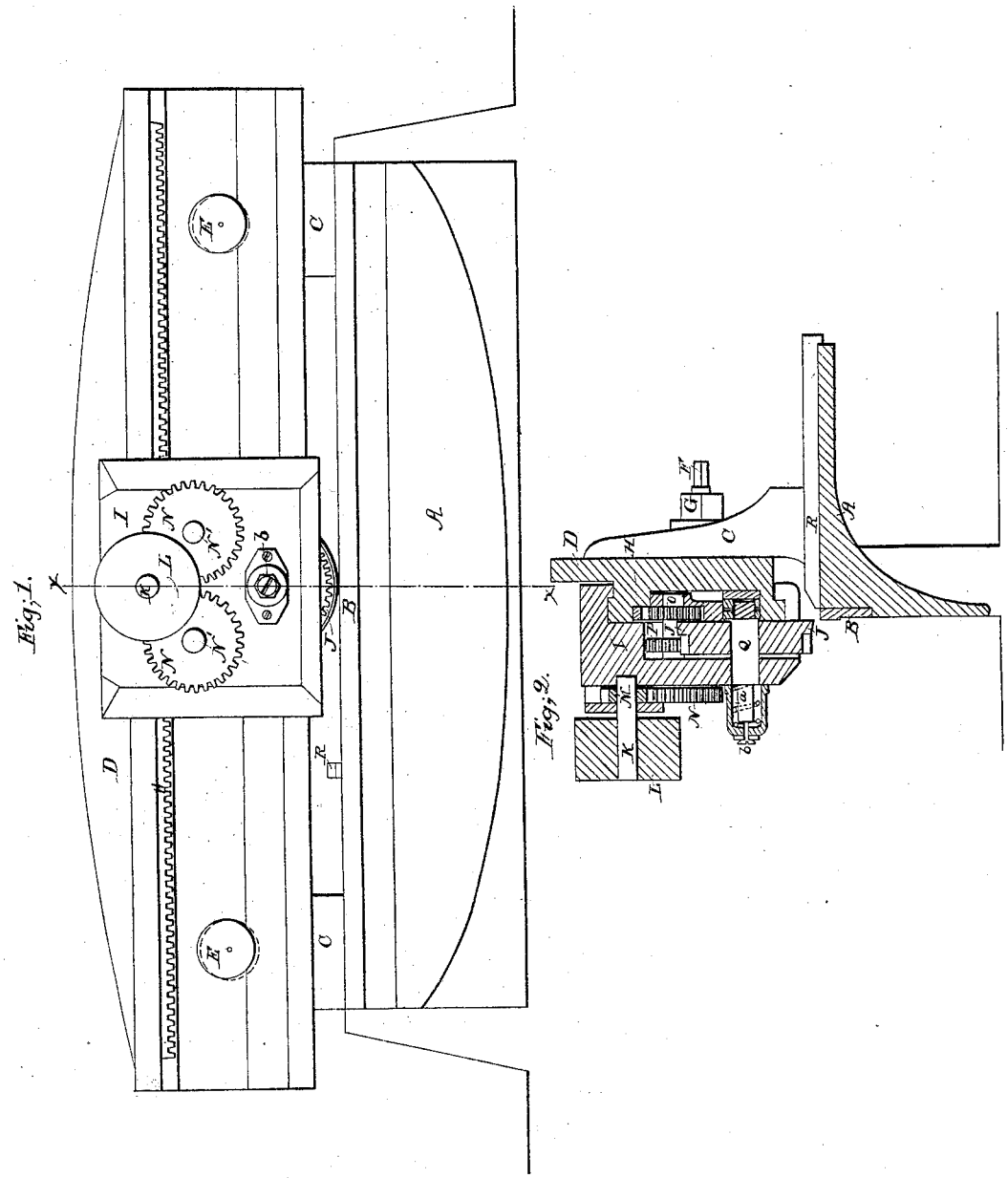

STEPHEN P. RUGGLES, OF BOSTON, MASSACHUSETTS.

MACHINE FOR CUTTING SHEET METAL.

Specification of Letters Patent No. 9,978, dated August 30, 1853.

*To all whom it may concern:*

Be it known that I, STEPHEN P. RUGGLES, of Boston, in the county of Suffolk and State of Massachusetts, have invented a certain new and useful Machine for Cutting Metals; and I do hereby declare the following to be a full, clear, and exact description of the same, reference being had to the accompanying drawings, making a part thereof, in which—

Figure 1 represents a view from one of the sides of the machine and Fig. 2 represents a vertical cross section taken at the red line *x x* of Fig. 1, similar letters in both figures referring to like parts.

In machines, for separating sheets of metal, as heretofore constructed, the blades, whether vibrating or rotary, have invariably had their cutting edges so arranged as that they should overlap or pass by each other. Such an arrangement, particularly in cutting the heavier sheets of metal, requires great power, but in all, whether thick or thin sheets, a large portion of the power is expended in forcing the two pieces apart; but a still greater practical difficulty is that, this waste of power does actual injury in twisting or bending the edges of the pieces thus cut, which must again be straightened before they can be used.

The nature of my invention consists in so hanging the shear or separating blades, as that their cutting edges shall be in the same line, and one so placed above the other as not even to come in contact, much less overlap each other, by which means I can cut a perfectly straight, square, and smooth edge without the least warping or twisting of them, and with great diminution of power, from the fact that the cutting edges need not pass into the sheet or plate, more than from one-half to two-thirds of its thickness, and yet it shall be entirely separated, and with smooth edges; and also in hanging the cutting blades or stocks on which they are supported, upon eccentric pins or bolts, for the purpose of giving them the most accurate adjustment, which they require with the varied thicknesses of metal sheets to be cut.

To enable others skilled in the art to make and use my invention, I will proceed to describe the same with reference to the drawings.

A substantial cutter stock or table A, of suitable length is provided, upon which is placed the straight shear blade B. Two upright arms or supports C, cast or wrought onto the table A, extend upward sufficiently far to hold and support the upper stock D, which carries the moving parts of the machine. The stock D, is attached or connected to the arms C, of the table A, by means of eccentric bolts E, provided with nuts G, for holding them firmly when the blades or stocks are properly adjusted, said bolts having also a square or many sided shank F, for receiving a wrench by which they may be turned. These eccentric bolts admit of the most accurate adjustment of the stocks; and the blades should be separated whenever the edges of the metal being cut warps or twists in the least, it having been found by practice that, there is a waste of power, and moreover actual injury done, whenever the edges of the sheet being cut begin to warp or twist, and that the depth to which the blades shall enter the sheet or plate may be ascertained by the straight, smooth cut made therein.

It is erroneous to suppose that, in cutting sheet metal, the blades should overlap or even meet, for metal plates half an inch in thickness may be cut or separated with clean, smooth edges, with a full quarter of an inch space between the cutters, and when thus separated they preserve a perfectly straight edge as before stated; and by way of further illustration, I might state that, when the cutters are so adjusted as just to touch a sheet, without cutting or scarcely marking it, if then another sheet of equal thickness be placed on the first, and both passed under the cutters in that position they will both be cut with clean smooth edges and entirely separated.

On the upper stock D, is arranged a rack H, and also suitable recesses and grooves, for receiving and holding the stock or carriage I, which carries the rotary blade J, and the several parts which operate it, and which may be constructed and arranged as follows: A shaft K, carries a drum or pulley L around which may pass the belt for giving it motion; the shaft also carries a spur gear wheel M, which so meshes with the cog wheels N, N, as to give said wheels a motion in the same direction. Near the inner ends of each of the shafts (N' N',) which carry the wheels N, N, are placed spur wheels O (one only being seen in the section Fig. 2) which take into the rack H, on the upper stock D, and when in motion cause the carriage I, containing the rotary cutter J, to traverse along said stock D. Each of the shafts N', N', also carry intermediate spur gear wheels (one only being seen in the drawing) which work into the cogs or teeth on the rotary cutter, giving it a rotary motion around its own axis, while it traverses the frame. The rotary cutter may move around its axis with greater speed than the carriage which sustains it traverses the frame—thus giving it a "drawing cut" as described and claimed in a former patent granted to me.

The shaft Q, of the rotary cutter J, is made adjustable, by means of the spiral spring $a$, encircling it, and the set screw $b$, so that the line of its cutting edge may stand in proper position in relation to, and over the cutting edge of the straight fixed blade B. The inner end of the shaft Q, is supported in a divided box $c, c$, so that when the rotating blade is to be adjusted to the stationary blade, thin sheets of tin, brass, or other metal $i$ may be laid between said divided boxes, for the purpose of keeping one section of the box close up against frame on which the carriage travels.

R, is a stop or gage on the table against which the sheets to be cut may rest. The belt for driving the traversing carriage, should be provided with a "take up" pulley or weight, for keeping it taut over the pulleys, as it approaches or recedes from the fixed pulley: and also with a reversing pulley or drum so as to run the carriage back and forth as may be required. The carriage may also if preferred be operated by a crank, pitman, or other well known device for giving a reciprocating motion.

A modification of this machine may be made, by allowing the rotary shear or cutter to move around a fixed axis, and causing the sheet of metal to traverse under or over it on a suitable carriage, but this would be the same in principle, as it merely involves a change of traversing motion from one cutter to the other. The cutters also instead of being placed one over the other, may be placed one alongside of the other, without change of principle.

Having thus fully described the nature of my invention what I claim therein as new and desire to secure by Letters Patent is—

1. The so hanging of a traversing, and a fixed cutting blade, one or both, as that their cutting edges, shall not overlap, or come in contact with each other, by which means I am enabled to divide sheets of metal, without twisting or warping their edges, and at great saving of power substantially as described.

2. I also claim the connecting of the upper and lower portions of the frame, when each carries one of the cutters, on eccentric bolts, suitably provided with screw and nut or their equivalent, for giving the blades on the said two parts of the frame a perfect adjustment one above the other substantially as described.

STEPHEN P. RUGGLES.

Witnesses:
F. O. PRINCE,
WM. H. SMITH.